(12) United States Patent
Kumar et al.

(10) Patent No.: US 9,326,186 B1
(45) Date of Patent: Apr. 26, 2016

(54) HIERARCHICAL FAIRNESS ACROSS ARBITRARY NETWORK FLOW AGGREGATES

(75) Inventors: Alok Kumar, Fremont, CA (US); Uday Ramakrishna Naik, Fremont, CA (US)

(73) Assignee: Google Inc., Mountain View, CA (US)

(*) Notice: Subject to any disclaimer, the term of this patent is extended or adjusted under 35 U.S.C. 154(b) by 527 days.

(21) Appl. No.: 13/617,523

(22) Filed: Sep. 14, 2012

(51) Int. Cl.
*H04W 28/02* (2009.01)
*H04W 28/00* (2009.01)

(52) U.S. Cl.
CPC ...... *H04W 28/0289* (2013.01); *H04W 28/0231* (2013.01)

(58) Field of Classification Search
CPC .......... H04L 47/10; H04L 45/00; H04L 43/16
USPC ........................................................ 709/223
See application file for complete search history.

(56) References Cited

U.S. PATENT DOCUMENTS

| | | | |
|---|---|---|---|
| 6,981,052 B1* | 12/2005 | Cheriton | 709/232 |
| 8,018,925 B2* | 9/2011 | Noriega | 370/370 |
| 8,082,358 B2 | 12/2011 | Wang et al. | |
| 8,724,508 B2 | 5/2014 | Chiang et al. | |
| 8,767,547 B2 | 7/2014 | Adams | |
| 9,060,285 B2 | 6/2015 | Salonidis et al. | |
| 2004/0136379 A1 | 7/2004 | Liao et al. | |
| 2009/0016236 A1* | 1/2009 | Alcala et al. | 370/253 |

* cited by examiner

*Primary Examiner* — Kevin Bates
*Assistant Examiner* — Jeyanath Jeyaratnam
(74) *Attorney, Agent, or Firm* — Foley & Lardner LLP; Edward A. Gordon

(57) ABSTRACT

Systems and methods are provided for allocating network resources across network flow aggregates to apply fairness at different levels of flow aggregation. Utility functions of member flows in each aggregate may be adjusted based on a target aggregate utility function. Processes for allocating network resources may then be performed using the adjusted member utility functions.

15 Claims, 7 Drawing Sheets

HIERARCHICAL FAIRNESS ACROSS ARBITRARY NETWORK FLOW AGGREGATES

FIELD OF THE DISCLOSURE

The present disclosure relates generally to traffic engineering in networking systems, and, more particularly, to allocating network resources across network flow aggregates.

BACKGROUND

In a communication network, a user may establish connections between a source node and a destination node via a flow of data transferred over one or more network paths. A group of two or more flows, or member flows, is referred to as a flow aggregate. The flow aggregate may be defined based on any suitable attribute of its member flows, such as the location of the corresponding source nodes or destination nodes, associated users, data type, and/or associated applications. For example, a flow aggregate may include all or a subset of all flows for a particular user between Europe and North America, all or a subset of all flows destined into or originating from a particular metropolitan area for a particular user, all or a subset of all flows associated with a particular application or product area, and all or a subset of all flows belonging to a group of users.

A flow may have a utility function U that maps between a performance measure u of the flow and a service s delivered by the network. The quantity s contains one or more measures of service delivered to the flow, for example, the amount of resources delivered to the flow such as bandwidth, delay and/or loss ratio. The quantity u may be based on a flow-level, user-level, and/or application-layer assessment, for example, the perceptual quality of a video stream or the speed of a file transfer.

Flows may have different utility functions. For example, some flows used by data applications such as electronic mail and file transfer may be relatively tolerant of end-to-end delays. The utility functions of these flows can be modeled using a continuous, diminishing-return (logarithmic) utility function such as utility function 22 of FIG. 1A (where $U(s) = \log s$). In contrast, some flows, such as ones associated with real-time applications, are highly sensitive to delay and can experience severe performance degradation if the flows do not receive sufficient resources, such as bandwidth. The utility functions of such flows may be modeled using a nearly single step utility function such as utility function 21 of FIG. 1A. Yet other flows may have a best effort (linear) utility function such as utility function 23 of FIG. 1A, where utility linearly increases with assigned bandwidth according to one utility weight w ($U(s) = w*s$). Other flows may have utility functions that increase linearly but discontinuously, i.e., according to utility weights that vary as the available bandwidth changes. In these cases, utility may be modeled using a piecewise linear function such as utility function 24 of FIG. 1A.

The allocation of shared resources to different flows of a network is a fundamental problem in distributed computing and networking. A well accepted principle is that network resources belong to all flows and thus should be shared among the flows in a fair and non-discriminatory way. Various fairness criteria can be used.

In one fair allocation strategy, known as bandwidth max-min fairness, resources are allocated among individual flows to be max-min fair. According to this strategy, network resources are assigned to individual flows in order of increasing demand. This strategy attempts to maximize the minimum resources received by any individual flow sharing the network. This strategy, however, does not take into account the utility or benefit to each flow from the allocated resources.

In another fair allocation strategy, known as utility max-min fairness, resources are allocated among individual flows so that flow utilities from the allocated resources are max-min fair. This strategy attempts to maximize the minimum utility received by any individual flow sharing the network.

These bandwidth and utility max-min fairness strategies aim to achieve fairness at the flow level, by performing max-min fair allocation of either utility or bandwidth for each flow. These strategies, however, do not apply fairness at different levels of flow aggregation. For example, these strategies do not achieve fairness across groups of flows, or flow aggregates. In addition, these strategies do not achieve fairness across flow aggregates that are arbitrarily defined, e.g., across flow aggregates that include flows with different source nodes or destination nodes, or across flow aggregates that include flows used by particular applications or by particular groups of users.

SUMMARY

Accordingly, systems and methods disclosed herein allocate network resources among network flow aggregates. A target aggregate utility function is associated with a first aggregate of the plurality of aggregates. An initial member utility function is associated with each member flow of member flows in the first aggregate. An adjusted member utility function is generated for the each member flow based on the initial member utility function for the each member flow and the target aggregate utility function. The network resources are allocated to the each member flow based on the corresponding adjusted member utility function.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

To provide an overall understanding of the disclosure, certain illustrative implementations will now be described, including systems and methods for allocating resources in a network. However, it will be understood by one of ordinary skill in the art that the systems and methods described herein may be adapted and modified as is appropriate for the application being addressed and that the systems and methods described herein may be employed in other suitable applications and that such other additions and modifications will not depart from the scope thereof.

Implementations consistent with the principles of the disclosure relate to traffic engineering applications in networking systems. Systems and methods are provided for allocating resources of a network among flows and flow aggregates.

Figure 1A:
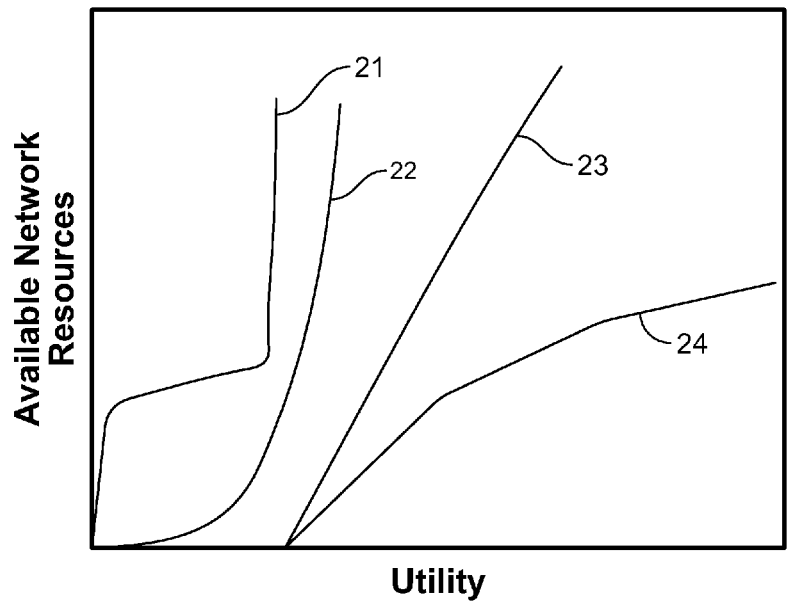
FIG. 1A is a graph depicting illustrative utility functions, according to illustrative implementations of the disclosure.
Figure 1B:
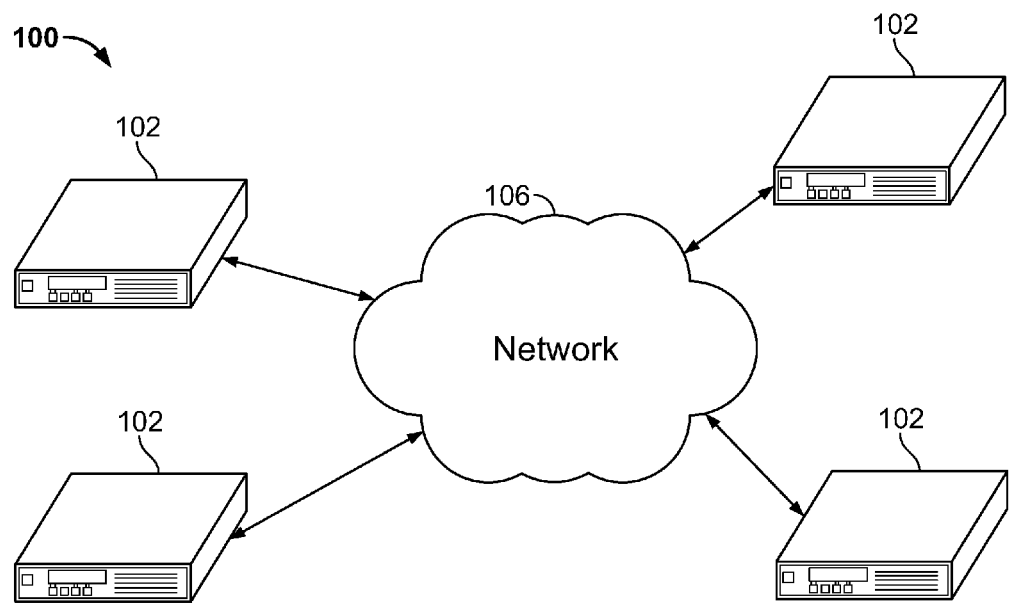
FIG. 1B is a block diagram depicting network elements communicating through a network, according to illustrative implementations of the disclosure.

FIG. 1B shows a block diagram depicting network elements communicating through a network, according to illustrative implementations of the disclosure. System 100 may allow multiple network nodes 102 to connect via a network 106. For example, network nodes 102 may communicate information with each other via network 106. Network nodes 102 may include servers, routers, switches, gateways, network links, client devices, mobile devices, or any other receiver, transmitter, and/or transceiver circuitry capable of providing information to be routed through network 106. Network 106 may include any combination of network links, including, without limitation, digital subscriber lines, ISDN network links, Ethernet links, wireless links, fiber optic links, frame relay network links, asynchronous transfer mode (ATM) network links, or virtual private network (VPN) links. Network 106 may route information through a number of routers, network links, or network nodes within network 106.

Figure 2:
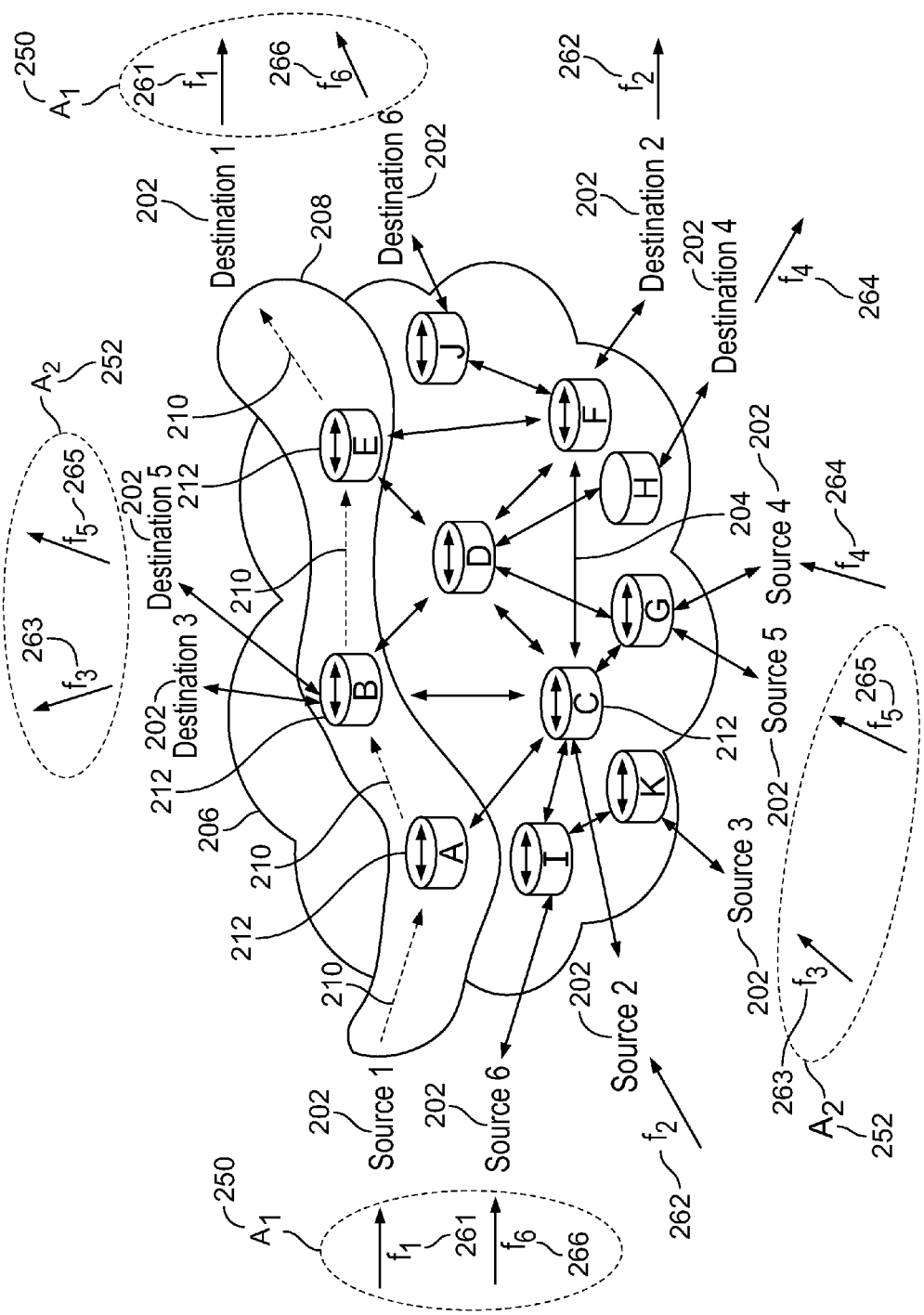
FIG. 2 shows a detailed diagram of a system depicting a network, according to illustrative implementations of the disclosure.

FIG. 2 shows a detailed diagram of system 200 depicting network 206, according to illustrative implementations of the disclosure. The network links contained within network 206 include network nodes A through J and network arcs 204. Network nodes A through J may be implemented as a router or any receiver, transmitter, and/or transceiver circuitry capable of routing information to other network nodes via network arcs 204. Network arcs 204 represent the communication between two connecting network nodes 212.

System 200 may include multiple network edge nodes 202, such as source nodes 1 through 6, and destination nodes 1 through 6, located at the edge of network 206. Edge nodes may provide information to be routed through network 206 from a source node to a destination node. For example, source node 1 may provide information to the network to be routed to destination node 1. A connection between a source node and a destination node will be referred to herein as a path. The information communicated between a source node and a destination node will be referred to herein as a flow. For example, path 208 may be formed for a flow $f_1$ (labeled as 261) communicated between source node 1 and destination node 1, which includes network nodes A, B, and E connected via network arcs 210. Multiple paths may exist between a source node and a destination node for a given flow. Any subset of network nodes A through J and network arcs 204 that provide a connection between a source node and a corresponding destination node may be a path for the flow from a source node to a destination node. Six illustrative flows, $f_1$, $f_2$, $f_3$, $f_4$, $f_5$, $f_6$ are shown in FIG. 2, and are respectively labeled as 261, 262, 263, 264, 265, and 266.

In certain implementations, flows may be categorized by the type of information that is being communicated. For example, web site data traffic may be categorized as one type of flow, and voice over internet protocol (VOIP) data may be a different type of flow. In some implementations, flows may be categorized by the priority of the information that is being communicated. For example, VOIP data may be categorized as a high priority flow since multiple people may be talking to each other in real-time, whereas background backup data traffic which has no time constraints may be categorized as a low priority flow. In certain implementations, the priorities may be based on assured forwarding (AF) classes of data traffic or best-effort (BE) classes of data traffic. These classes of data traffic are prioritized based on their class number. A higher class number indicates a higher priority. For example, AF4 class of data traffic has higher priority than AF1 class of data traffic.

A group of two or more flows is referred to as a flow aggregate. In the illustrative network of FIG. 2, flow aggregate A1, shown as 250, includes member flows $f_1$ (between destination 1 and source 1) and $f_6$ (between destination 6 and source 6). Flow aggregate A2, shown as 252, includes flows $f_3$ and $f_5$. A flow aggregate may also be defined to include other flow aggregates. Member flows of a flow aggregate do not necessarily have the same source or the same destination nodes and can be determined based on any suitable attribute, such as associated geographical location, data type, associated users, and/or associated applications. For example, a flow aggregate may include all or a subset of all flows for a particular user between Europe and North America, all or a subset of all flows destined into or originating from a particular metropolitan area for a particular user, all or a subset of all flows associated with a particular application or product area, and all or a subset of all flows belonging to a group of users.

The amount of network resources that a flow or flow aggregate may request will be referred to herein as flow demand or flow aggregate demand, respectively. Examples of such network resources include, but are not limited, to bandwidth, delay, delay jitter, and/or loss ratio. For the purposes of clarity, this description primarily refers to bandwidth. However, it will be understood that bandwidth is merely an example of network resources, and that any appropriate service measure delivered by a network to a flow may be used.

The amount of resources that is allocated to a flow or flow aggregate on a certain path will be referred to herein as a width of the flow or the flow aggregate on that path. The total amount of resources that a flow or a flow aggregate is allocated over all paths will be referred to herein as the allocation of the flow or flow aggregate. The total capacity of resources that may be allocated over a network arc 204 will be referred to herein as the capacity of the arc.

The processes described herein may be applied to a network, for example to network similar to network 106 of FIG. 1B or network 206 of FIG. 2. A network may be specified by its set of network nodes, network links, network arcs and network arc capacities. The traffic to be routed may be specified by a set of flows, each with a source node, a destination node, and a network demand. Resource allocation for each flow or flow aggregate, from zero to the upper bound on its access rate, and how to route the flow or flow aggregate may be determined using methods described herein. The resources allocated through each network node and through each network arc may be configured through network control circuitry. The network control circuitry may be spread over each network node or may be centralized. Processes and operations performed by the network, including allocations, may be implemented using the network control circuitry. The flow or flow aggregate may be routed in split paths that include a set of paths and the bandwidth allocated on each path. The spit paths, or splits, are the distribution of the resources allocated to each flow or flow aggregate among its possible paths, and may be determined according to the processes described herein.

Systems and methods described herein may provide a plurality of fairness levels at various flow aggregation levels over a network, for example over a network similar to network 106 of FIG. 1B or network 206 of FIG. 2 These fairness levels may be hierarchically related, such that a first fairness level applies across a plurality of parent flow aggregates, such as aggregates 250 and 252 in network 206 of FIG. 2, and a second fairness level applies across member flows or member flow aggregates 250 and 252 in network 206 of FIG. 2, and a second fairness level applies across member flows or member flow aggregates within each one of the parent flow aggregates, e.g., between member flows $f_1$ and $f_6$ in aggregate 250 and between member flows $f_3$ and $f_5$ of aggregate 252 of FIG. 2. For the purposes of clarity, the following description will assume that the first fairness level applies across J flow aggregates $A_j$ in a network and that the second fairness level applies across $I^{A_j}$ member flows within each corresponding aggregate $A_j$ (j=1, . . . J; $I^{A_j}$ and J are integers greater than 1). This is merely illustrative, and other levels of aggregation can be provided without departing from the scope of the disclosure. For example, the methods and systems provided herein may apply more than two fairness levels to aggregates that include other aggregates, or they may apply the first fairness level across aggregates and individual flows.

In an illustrative implementation, flow aggregates are defined based on a corresponding product area. For instance, a first flow aggregate $A_1$, such as aggregate 250 of FIG. 2, may include $I^{A_1}$ member flows from all users using an email application over a network. A second flow aggregate $A_2$, such as aggregate 252 of FIG. 2, may include $I^{A_2}$ member flows from all users using a search application over the network. Processes described herein may provide a first fairness level between the email and search aggregates. For example, the processes may split bandwidth between the email and search aggregates in a max-min fair (mmf) manner. In addition, processes may provide a second fairness level across the member flows within each of the email and search aggregates. For example, assuming two users X and Y are using the search application, the processes may split bandwidth between the member flow of X (e.g., flow $f_3$ of FIG. 2) and the member flow of Y (e.g., flow $f_4$ of FIG. 2) in an mmf manner. If the member flow of X cannot or does not use a portion of its assigned bandwidth, then the member flow of user Y may be given access the leftover bandwidth from user X before the leftover bandwidth is allocated outside of the search aggregate. For example, if flow $f_3$ in aggregate $A_2$ of FIG. 2 does not use a portion of its assigned bandwidth, then flow $f_4$ in the same aggregate $A_2$ of FIG. 2 is given a higher priority to access the unused bandwidth than flows in other aggregates, e.g., than flows $f_1$ or $f_6$ of aggregate $A_1$ of FIG. 2.

Figure 3:
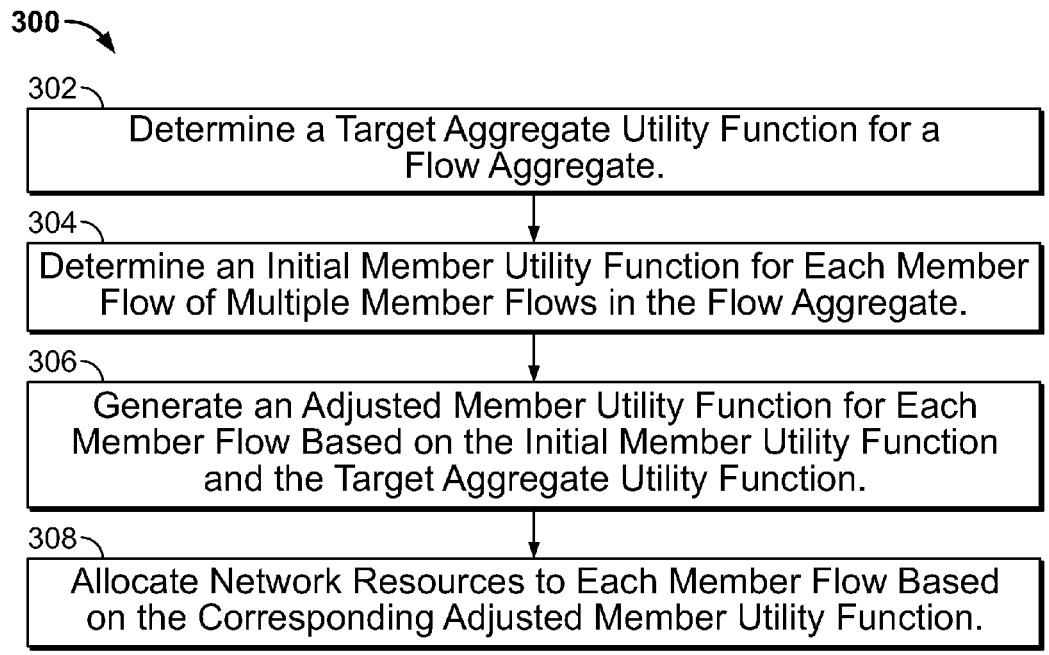
FIG. 3 is a flowchart depicting an illustrative process for allocating resources over flow aggregates of a network according to some implementations.

FIG. 3 is a flowchart depicting an illustrative process 300 for allocating resources over flow aggregates of a network according to some implementations. Elements 302-308 may be performed for each aggregate of a plurality of J flow aggregates $A_j$ in a network in a network. These elements may be performed substantially in parallel and/or in sequence, as appropriate.

At 302, a target aggregate utility function is determined for each flow aggregate. The target aggregate utility function maps between a performance measure u of the flow aggregate and the service s delivered by the network to the flow aggregate. In some implementations, determining the target aggregate utility function may include receiving the target aggregate utility function, receiving at least part of the target aggregate utility function as an input, retrieving the target aggregate utility function from local or remote memory, and/or receiving certain characteristics of the target aggregate utility function. In some implementations, determining the target aggregate utility function may involve generating the target aggregate utility function, locally or centrally, based on attributes of the flow aggregate. The target aggregate utility function may be characteristic of its corresponding aggregate and may reflect certain attributes of the aggregate, such as a priority level associated with the aggregate, independently of the number and/or independently of at least some attributes of the member flows. Other attributes of an aggregate, such as the type of communicated data, the corresponding application, the corresponding users, the corresponding source nodes, and/or destination nodes, may be used as basis for defining the aggregate and its corresponding target aggregate utility function.

At 304, an initial member utility function is determined for each member flow of a plurality of member flows in the flow aggregate. Each initial utility function maps a performance measure u of the flow and the service s delivered by the network to the flow. Like determining the target aggregate utility function at 302, determining the initial member utility functions may involve receiving the initial member utility functions as input, retrieving the initial member utility functions from memory, and/or generating the initial member utility functions based on attributes of the corresponding member flows.

In one non-limiting example, a first illustrative flow aggregate having a 1,000 member flows and corresponding to a first internet service provider ISP1 may have the same priority as a second illustrative flow aggregate having two flows and corresponding to a second internet service provider ISP2. Because both aggregates for ISP1 and ISP2 have the same priority, both aggregates may be determined to have the same target aggregate utility function, even if the aggregates have, as in this example, a substantially different number of member flows. For instance, each of the aggregates may be determined to have a linear target aggregate utility function with a slope equal to one. In addition, each of the 1,000 member flows of the first aggregate and of the two member flows of the second aggregate may be determined to have a linear initial member utility function with a slope equal to one. In this case, the sum of the initial member flow utility functions for the first and second aggregate has a slope of 1,000 and two, respectively. By allocating resources based on the target utility function rather than the sum of member utility functions, the first aggregate may not gain allocation advantage relative to the second aggregate simply because the first aggregate includes more member flows than the second aggregate.

At 306, an adjusted member utility function is generated for each member flow based on the initial member utility function for that member flow and the target aggregate utility function. For example, the adjusted member utility functions are created by transforming the initial member utility functions so that the sum of the adjusted member utility functions is equal to the target aggregate utility function and so that the transformation preserves some attributes of the initial member utility functions. For example, the relative slopes in the adjusted member utility functions may be the same as the relative slopes in the initial member utility functions. Referring back to the example of ISP1 and ISP2 described above, where the initial member utility functions for each of the 1,000 member flows of ISP1 have the same slope (e.g., equal to 1), the adjusted member utility function for each of the 1,000 member flows of ISP1 may also have the same slope (but, in this example, equal to $1/1,000$). Similarly, the initial member utility functions for each of the two member flows of ISP2 have the same slope (e.g., equal to 1), and the adjusted member utility function for each of the two member flows of ISP2 may also have the same slope (but, in this example, equal to $1/2$).

At 308, network resources are allocated to each member flow based on its corresponding adjusted member utility function. By using the adjusted member utility functions to allocate resources to flows in aggregates of the network, the resources may be allocated in a hierarchically fair manner, e.g., such that the allocation may be mmf across aggregates and may be mmf within flows of each aggregate. This may be done without wasting available bandwidth (i.e., in a work-conserving manner) and without over-allocating links in the network. Embodiments of process 300 are described in more detail with respect to FIGS. 4-7 below.

Figure 4:
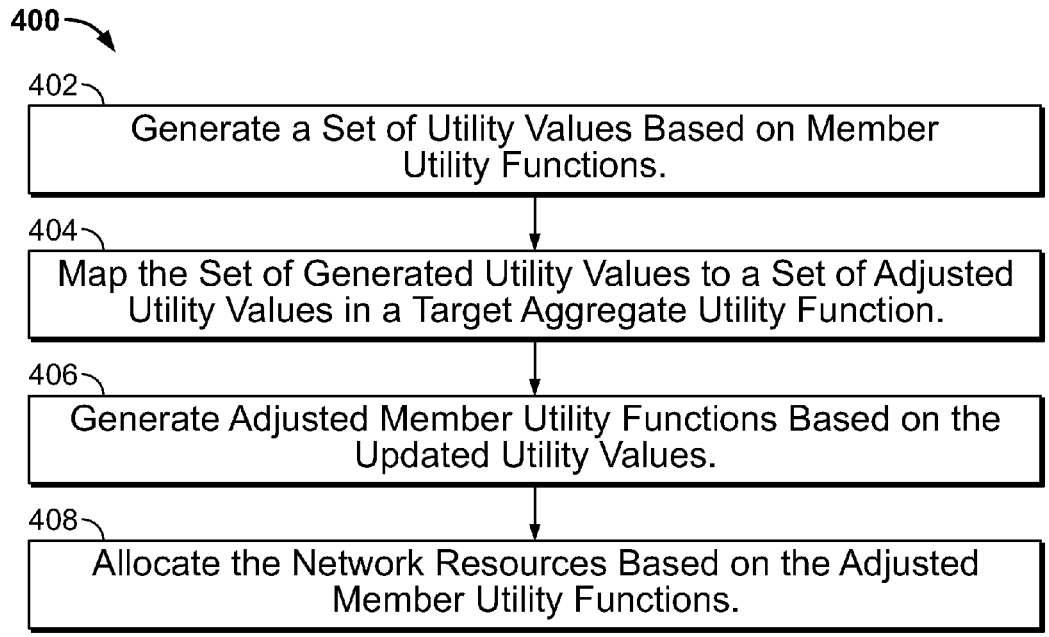
FIG. 4 is a flowchart depicting an illustrative process for allocating network resources, such as bandwidth, over the network based on adjusted utility functions, according to implementations of the disclosure.

FIG. 4 is a flowchart depicting an illustrative process 400 for allocating network resources, such as bandwidth, over the network based on adjusted utility functions, according to implementations of the disclosure.

At 402, a set of utility values is generated based on member utility functions for member flows of an aggregate. These utility values may correspond to specific attributes of the member utility functions, such as discontinuity points of each of the member utility functions.

At 404, the set of utility values generated at 402 is mapped to a set of adjusted utility values in a target aggregate utility function. The target aggregate utility function may be similar to the one determined at 302 of FIG. 3. This mapping may define a specific transformation from utility values in member utility functions to utility values in the target aggregate utility function. In some implementations, generating this mapping may involve summing the member utility functions to generate an aggregate utility function, as described in more detail in FIG. 5 below.

At 406, adjusted member utility functions are generated based on the adjusted utility values from 404. In some implementations, the adjusted member utility functions are generated such that they sum to the target aggregate utility function and/or preserve some attributes of the initial member utility functions, such as relative slopes or limits on total resources delivered for a certain utility value.

At 408, the network resources are allocated based on the adjusted member utility functions. This may be similar to 308 of FIG. 3.

Figure 5:
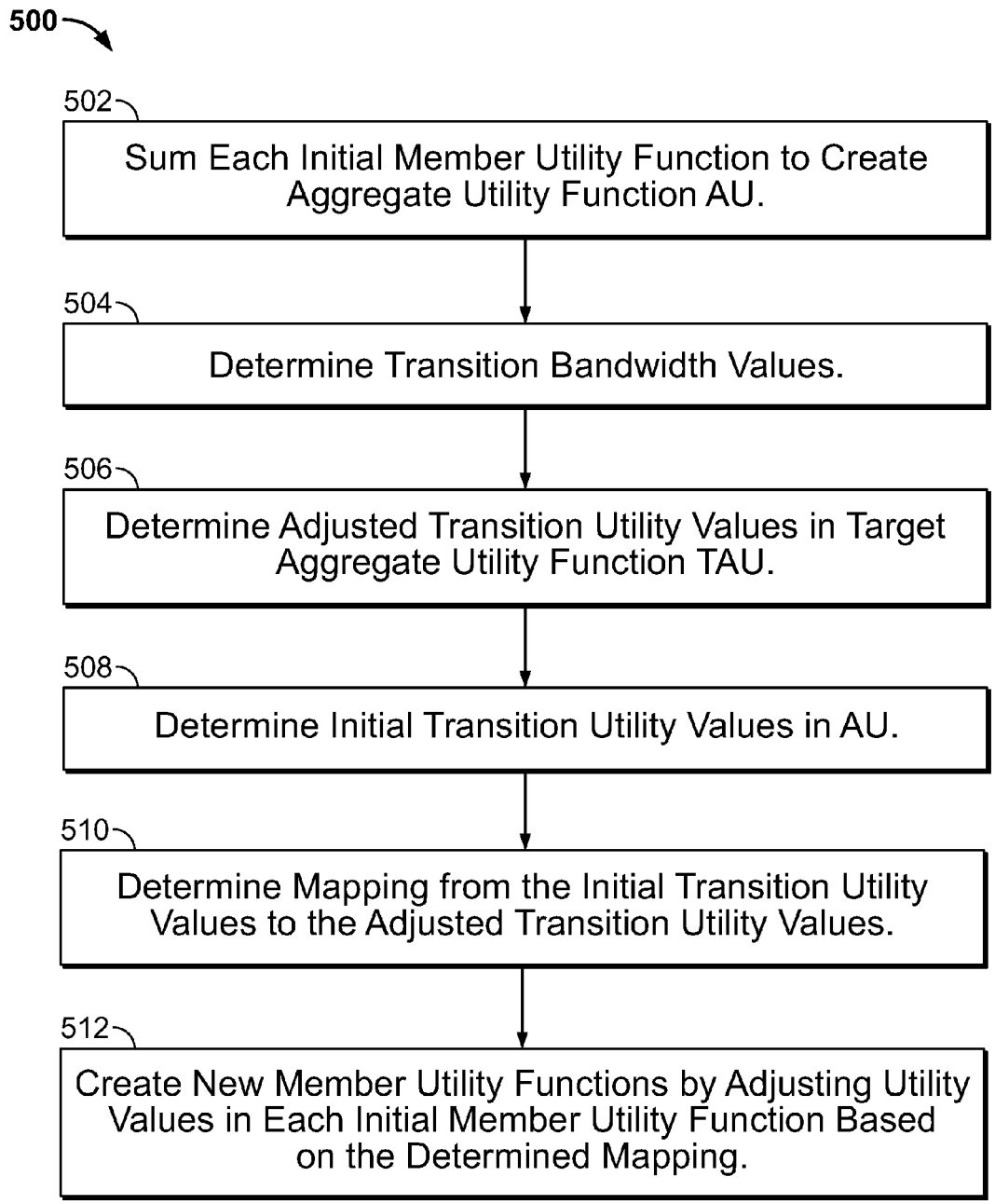
FIG. 5 is a flowchart depicting an illustrative process for allocating bandwidth over the network based on adjusted utility functions, according to implementations of the disclosure.

FIG. 5 is a flowchart depicting an illustrative process 500 for allocating bandwidth over the network based on adjusted utility functions, according to implementations of the disclosure. Process 500 may take as input utility functions for each of the member flows (i.e., member utility functions) and a desired utility function for the corresponding flow aggregate (i.e., a target aggregate utility function). Elements of process 500 will be described with reference to FIGS. 7A-F, which shows illustrative utility functions according to some implementations. Although FIGS. 7A-F illustrate graphs of utility functions, this is meant for the purposes of illustration not limitation. The methods and systems described herein may apply to any representation of a utility function, e.g., using numbers, equations, etc., without departing from the scope of this disclosure.

Figure 7A:
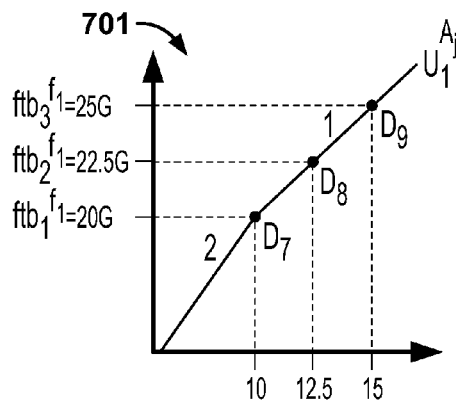
FIGS. 7A, 7B, 7C, 7D, 7E, and 7F, collectively referred to as FIG. 7 hereinafter, show illustrative utility functions that may be output by methods and systems based on implementations of the disclosure.

In the example of FIGS. 7A-F, an aggregate $A_j$ includes two member flows $f_1^{A_j}$ and $f_2^{A_j}$. Member flow $f_1^{A_j}$ has a utility function $U_1^{A_j}$ represented by graph 701 of FIG. 7A. The x-axis represents a utility u of flow $f_1^{A_j}$, which, in this example, is a number from 0 to 200. Utilities, however, may be represented using any suitable scale, such as percentages. The y-axis represents the amount of network resources, in this example, of bandwidth in Gigabits (G), requested by flow $f_1^{A_j}$ to achieve the corresponding utility. In the example of FIG. 7A, the bandwidth requested by flow $f_1^{A_j}$ increases linearly with a slope equal to 2 until discontinuity point D7 to achieve utilities from u=0 to u=10, then with a slope equal to 1 to achieve utilities above u=10.

Figure 7B:
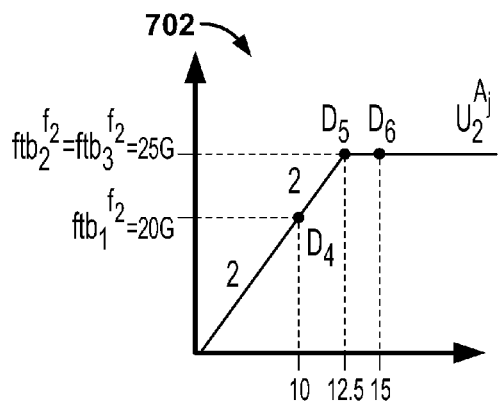

Similarly, member flow $f_2^{A_j}$ has a utility function $U_2^{A_j}$ represented by graph 702 of FIG. 7B. In the example of FIG. 7B, the bandwidth requested by flow $f_2^{A_j}$ increases linearly until discontinuity point D5 with $f_2$ a slope equal to 2 to achieve utilities from u=0 to u=12.5, then is constant at 25 G for utilities above u=12.5.

Figure 7C:
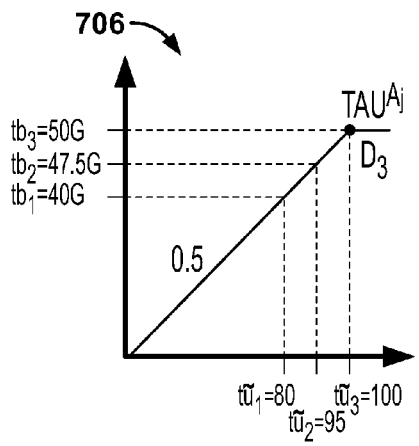

Aggregate $A_j$ has a target utility function $TAU^{A_j}$ represented by graph 706 of FIG. 7C. Such target utility function may be derived from a contract limiting the bandwidth available to an application (and its corresponding flow aggregate) to 50 G.

The utility functions $U_1^{A_j}$, $U_2^{A_j}$, and $TAU^{A_j}$ may be readily available at the beginning of the allocation process, such as process 500 of FIG. 5 or they may be generated. Although the depicted utility functions are piecewise linear and show specific bandwidth and utility values, this is merely illustrative. The systems and methods described herein apply to non-linear utility functions and to network resources other than bandwidth.

At 502, the initial member utility functions are summed to create an aggregate utility function AU. For example, utility functions $U_1^{A_j}$ and $U_2^{A_j}$ of FIGS. 7A and 7B are summed to create aggregate utility function $AU^{A_j}$ represented by graph 703 of FIG. 7F. As can be seen in FIG. 7F, the aggregate utility function includes two discontinuity points D1 and D2 that correspond to, and have the same utility values as, the discontinuity point D7 of $U_1^{A_j}$ of FIG. 7A and discontinuity point D5 of $U_2^{A_j}$ of FIG. 7B, respectively.

At 504, a set TB of transition bandwidth values is determined from the aggregate utility function AU created at 502 and/or from the target aggregate utility function for the particular aggregate. A transition bandwidth value refers herein to a bandwidth value corresponding to one or more specific points of functions $AU^{A_j}$ and/or $TAU^{A_j}$. These points may be discontinuity points, inflection points, any point associated with a change in the curvature or slope of the utility function graph and/or any point associated with a change in the relation between utility and bandwidth in the utility function.

Figure 7D:
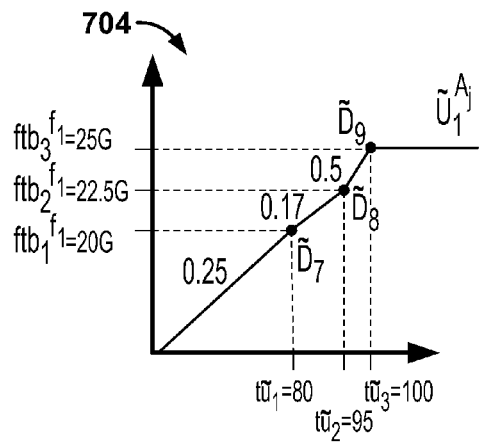
Figure 7E:
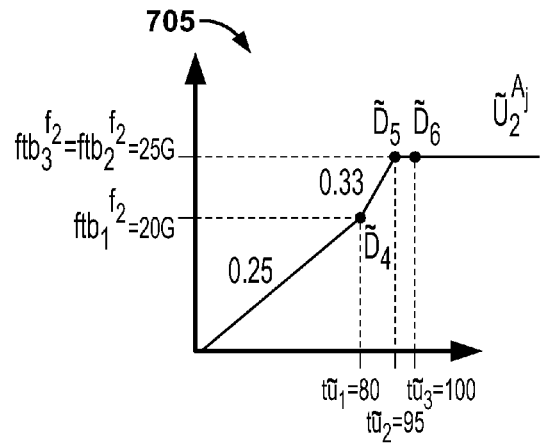
Figure 7F:
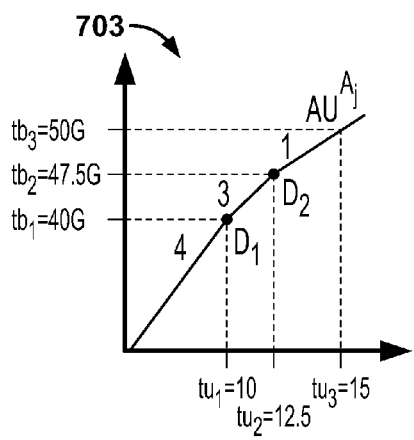

Referring to the example of FIGS. 7A-F, transition bandwidth values are determined from aggregate utility function $AU^{A_j}$ of FIG. 7F and/or from the target aggregate utility function $TAU^{A_j}$ of FIG. 7D. This may be done by determining discontinuity points of $AU^{A_j}$ (and/or $TAU^{A_j}$) then determining the associated bandwidth from the y-value coordinate of each discontinuity point. In the illustrative example of FIGS. 7A-F, two discontinuity points, D1 and D2, are determined from $AU^{A_j}$ (of FIG. 7F) and another discontinuity point D3 is determined from $TAU^{A_j}$ (of FIG. 7D). The y-coordinates of the determined discontinuity points correspond to transition bandwidth values $tb_1$=40 G (from D1), $tb_2$=47.5 G (from D2), and $tb_3$=50 G (from D3). The values of the set of transition bandwidth values TB={$tb_1$=40 G, $tb_2$=47.5 G, $tb_3$=50 G}, resulting from applying 502 and 504 of FIG. 5 to utility functions $U_1^{A_j}$, $U_2^{A_j}$, and $TAU^{A_j}$, are shown on the y-axis of FIG. 7F.

At 506, a set $\widetilde{TU}$ of adjusted transition utility values is determined. These adjusted transition utility values correspond to the transition bandwidth values of TB from $TAU^{A_j}$. In the illustrative example of FIG. 7C, the set $\widetilde{TU}$ includes L=3 adjusted transition utility values $\widetilde{tu}_1$, $\widetilde{tu}_2$, and $\widetilde{tu}_3$ based on transition bandwidth values $tb_1$=40 G, $tb_2$=47.5 G, and $tb_3$=50 G, respectively. This may be done by finding the x-coordinate values for transition bandwidth values $tb_1$, $tb_2$, and $tb_3$, respectively, or by any other means for applying the inverse of function $TAU^{A_j}$ to the transition bandwidth values. In some implementations, some adjusted transition utility values may be derived from discontinuity point in $TAU^{A_j}$, for example, adjusted transition utility value $\widetilde{tu}_3$ may be derived from D3 in FIG. 7D. In the example of FIG. 7C, the set of adjusted transition utility values is determined as $\widetilde{TU}=\{\widetilde{tu}_1=80, \widetilde{tu}_2=95, \widetilde{tu}_3=100\}$.

At 508, a set TU of initial transition utility values is determined from $AU^{A_j}$. These initial transition utility values may correspond to the transition bandwidth values from 504. For example, these initial transition utility values are the utility values in $AU^{A_j}$ that correspond to the transition bandwidth values in TB. In the example of FIG. 7F, the set of initial transition utility values is determined as TU=$\{tu_1=10, tu_2=12.5, tu_3=15\}$.

At 510, a mapping m is determined from the set of initial transition utility values TU in AU to the set $\widetilde{TU}$ of adjusted transition utility values in TAU. For example, a relation between an $l^{th}$ element of TU and $l^{th}$ element of the set $\widetilde{TU}$ is established.

Referring back to the example of FIGS. 7A-F, the mapping m can be represented as follows: TU=$\{tu_1=10, tu_2=12.5, tu_3=15\} \xrightarrow{m} \widetilde{TU}=\{\widetilde{tu}_1=80, \widetilde{tu}_2=95, \widetilde{tu}_3=100\}$. For example, the mapping m may map respective elements of both sets of utility values as follows:

$$tu_1=10 \xrightarrow{m} \widetilde{tu}_1=80$$

$$tu_2=12.5 \xrightarrow{m} \widetilde{tu}_2=95$$

$$tu_3=15 \xrightarrow{m} \widetilde{tu}_3=100.$$

At 512, a new member utility function is created for each member flow by adjusting utility values in the initial member utility function based on the mapping determined in 510. For example, a flow transition bandwidth value $ftb_l^{f_i}$ is determined for each initial transition utility value $tu_l$ in TU from the initial member utility function of flow $f_i$. The initial member utility function is then transformed such that the flow transition bandwidth value $ftb_l^{f_i}$ corresponds to the transition utility value $\widetilde{tu}_l$ in $\widetilde{TU}$ of the target aggregate utility function.

Referring back to the example of FIGS. 7A-F, adjusted utility function $\widetilde{U}_1^{A_j}$ is created from transforming $U_1^{A_j}$ based on mapping m. Similarly, adjusted utility function $\widetilde{U}_2^{A_j}$ is created from transforming $U_2^{A_j}$ based on mapping m. Details of this transformation are described below.

In FIG. 7B, each transition utility value $tu_l$ in $\widetilde{TU}$ is mapped to a corresponding flow transition bandwidth value $ftb_l^{f_2}$ using the initial member utility function $U_2^{A_j}$. In the example of FIG. 7B, these flow transition bandwidth values are determined as $ftb_1^{f_2}$=20 G (for $tu_1$=10), $ftb_2^{f_2}$=25 G (for $tu_2$=12.5), and $ftb_3^{f_2}$=25 G (for $tu_3$=15). To create $\widetilde{U}_2^{A_j}$ of FIG. 7E, $U_2^{A_j}$ is transformed such that each $ftb_l^{f_2}$ corresponds to $\widetilde{tu}_l$ in $\widetilde{TU}$ (as in FIG. 7E) instead of $tu_l$ in TU (as in FIG. 7B). This transformation may be viewed as horizontally shifting points D4, D5, and D6 in FIG. 7B to points $\hat{D}4$, $\hat{D}5$, and $\hat{D}6$, in FIG. 7E, respectively.

A similar transformation is applied to $U_1^{A_j}$ of FIG. 7A to obtain $\widetilde{U}_1^{A_j}$ of FIG. 7D. Each transition utility value $tu_l$ in $\widetilde{TU}$ is mapped to a corresponding flow transition bandwidth value $ftb_l^{f_1}$ using the initial member utility function $U_1^{A_j}$. In the example of FIG. 7A, these flow transition bandwidth values are determined as $ftb_1^{f_1}$=20 G (for $tu_1$=10), $ftb_2^{f_1}$=22.5 G (for $tu_2$=12.5), and $ftb_3^{f_1}$=25 G (for $tu_3$=15). To create $\widetilde{U}_1^{A_j}$, $U_1^{A_j}$ is transformed such that each $ftu_l^{f_1}$ maps to $\widetilde{tu}_l$ in $\widetilde{TU}$ (as in FIG. 7D) instead of $tu_l$ in TU (as in FIG. 7A). Points D7, D8, and D9 in FIG. 7A are horizontally shifted to points $\hat{D}7$, $\hat{D}8$, and $\hat{D}9$, in FIG. 7D, respectively. Because the target utility function is flat beyond D3 of FIG. 7C, and because $\hat{D}9$ of FIG. 7D corresponds to D3 of FIG. 7C, the adjusted member utility function of FIG. 7D is set as flat beyond $\hat{D}9$ so that the sum of the adjusted member utility functions of FIGS. 7D and 7E is equal to the target aggregate utility function of FIG. 7C.

In some embodiments, the transformation is done such that certain attributes of the adjusted member utility functions are relatively the same as those for the initial member utility functions. For example, a comparison between FIGS. 7A and 7B on one hand, and between FIGS. 7D and 7E on the other hand, shows that both initial member utility functions of 7A and 7B have the same slope until 20 G (slope equal to 2), which is also true for the adjusted member utility functions of FIGS. 7D and 7E (slope equal to 0.25). After 20 G, the initial member utility function of FIG. 7A is half that of the initial member utility function of FIG. 7B. This is also true for the adjusted member utility functions of FIGS. 7D and 7E, i.e., the adjusted member utility function of FIG. 7D is half that of the adjusted member utility function of FIG. 7E. When the adjusted member utility function of FIG. 7E saturates beyond $\hat{D}5$, then the adjusted member utility function of FIG. 7D gets full share until the target aggregate utility function saturates at D3 of FIG. 7C (corresponding to $\hat{D}9$ of FIG. 7D).

These new member utility functions may be used in fairness allocation algorithms instead of the initial member utility functions. By using these member utility functions, multiple levels of fairness are provided, at the aggregate and the member flow level.

In some implementations, systems and methods described herein try to reallocate resources unused by a member flow to other member flows in the same aggregate before reallocating the unused resources to other aggregates. For example, if a member flow within an aggregate $A_j$ is saturated because of a heavily congested link that is not shared by other member flows of the aggregate $A_j$, then a smaller amount of resources may be reallocated to the saturated flow in order to protect the congested link from over-allocation. Other member flows in the same aggregate $A_j$ may be given priority to access the amount of resources unused by the saturated flow relative to flows of other aggregates. An example of these allocation strategies is described in FIG. 6.

Figure 6:
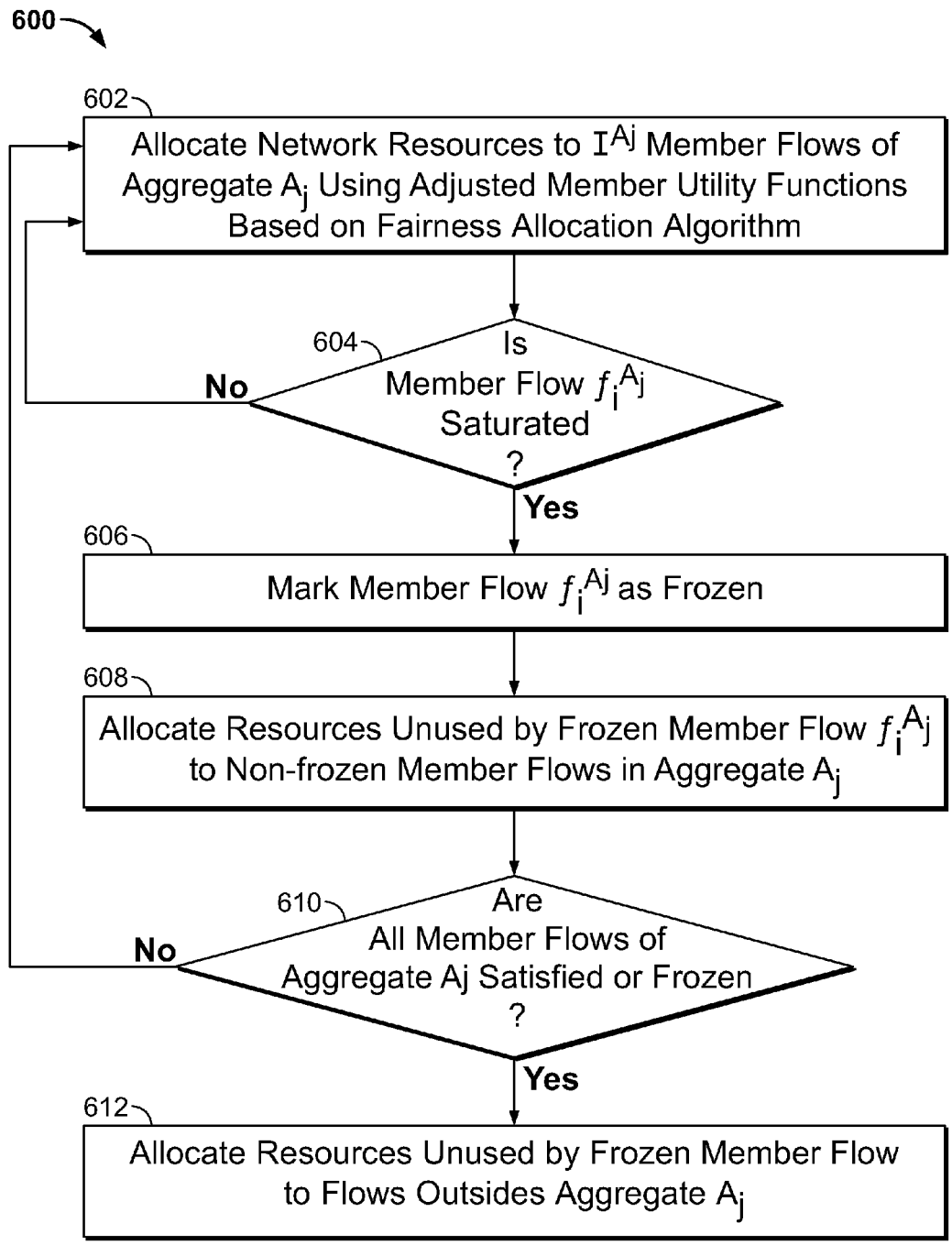
FIG. 6 represents a flowchart depicting an illustrative process for allocating bandwidth over the network according to some implementations.

FIG. 6 represents a flowchart depicting an illustrative process 600 for allocating bandwidth over the network according to some implementations. Process 600 may be performed on each aggregate $A_j$ of J flow aggregates in parallel and/or in sequence. For example, process 600 may be implemented as part of 308 of FIG. 3 or 408 of FIG. 4.

At 602, an allocation algorithm is performed on $I^{A_j}$ member flows of flow aggregate $A_j$ using the adjusted member utility functions. These adjusted member utility functions may be generated by processes similar to ones described in FIGS. 3-5 above. Any appropriate allocation algorithm may be used. For example, linear programming algorithms may be used to allocate resources fairly based on the adjusted member utility functions.

In some implementations, the allocation algorithm may correspond to a progressive filling algorithm using the adjusted member utility functions. For example, the utility may initially be set to 0 for each member flow $f_i^{A_j}$ of the aggregate $A_j$ (i–1, ..., $I^{A_j}$). The utility is then increased by a small amount $\epsilon$ for each member flow. The bandwidth amount corresponding to the increased utility is computed from the adjusted member utility functions. Network links usage is then increased based on the computed bandwidth amount.

At 604, it is determined whether a member flow $f_i^{A_j}$ is saturated because of the allocation in 602. For example, process 600 may loop through links in the network and for each link check if the allocation of 602 causes the capacity of the link to be exceeded. If the capacity is exceeded at a given link, the link is a bottleneck link. The flows that traverse a bottleneck link are determined to be saturated.

If no member flow $f_i^{A_j}$ is determined to be saturated at 604, then the allocation is increased again by repeating 602 until all member flows are satisfied or frozen.

Alternatively, if a member flow $f_i^{A_j}$ is determined to be saturated at 604, then the member flow is marked at 606 as no longer active, or frozen. A frozen flow may not be allocated additional bandwidth and the bandwidth of the frozen flow may be fixed to the amount it has been allocated prior to saturation. The frozen flows may no longer participate in process 600.

At 608, the allocation from 602 that is unused by the frozen member flow is allocated to other member flows in the same aggregate $A_j$. This may be done by giving a higher priority access to the unused bandwidth to non-frozen (i.e., active) members flows in the aggregate than to member flows of other aggregates.

At 610, it is determined whether all member flows of aggregate $A_j$ are satisfied or frozen. If not, then the allocation is increased again by repeating 602. Otherwise, if all flow members of the aggregate $A_j$ are satisfied or frozen at 610, then the unused resources may be allocated at 612 to member flows belonging to one or more aggregates other than aggregate $A_j$. The process may continue until all member flows are satisfied or frozen.

The systems and methods described herein may provide a first fairness level at the aggregate level, by distributing resources fairly across multiple flow aggregates. This may be achieved even if the flow aggregates are arbitrarily defined and if member flows of each flow aggregate do not share the same source or destination nodes. Additionally, the systems and methods described herein may provide a second fairness level at the flow level, by distributing resources fairly across member flows within each aggregate. These systems and methods may operate without wasting available bandwidth (i.e., they are work conserving) and without over-allocating links in the network.

The foregoing description of illustrative implementations of the disclosure provides illustration and description, but is not intended to be exhaustive or to limit the disclosure to the precise form disclosed. Modifications and variations are possible in light of the above teachings or may be acquired from practice of the disclosure. For example, while series of methods have been described with regard to FIGS. 3-6 and herewithin, the order of the methods may be varied in other implementations consistent with the disclosure. Moreover, non-dependent methods may be implemented in parallel.

It will also be apparent to one of ordinary skill in the art that aspects of the disclosure, as described above, may be implemented in many different forms of software, firmware, and hardware in the implementations illustrated in the figures. The actual software code or specialized control hardware used to implement aspects consistent with the principles of the disclosure is not limiting of the disclosure. Thus, the operation and behavior of the aspects of the disclosure were described without reference to the specific software code, it being understood that one of ordinary skill in the art would be able to design software and control hardware to implement the aspects based on the description herein.

Further, certain portions of the disclosure may be implemented as "logic" or a "component" that performs one or more functions. This logic may include hardware, such as an application specific integrated circuit or a field programmable gate array, software, or a combination of hardware and software.

No element, step, or instruction used in the description of the invention should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for allocating network resources, the method comprising:
   receiving a target aggregate utility function for a first flow aggregate,
      wherein the first flow aggregate is one in a plurality of flow aggregates in a network, and aggregates a plurality of member flows associated with at least one of: an application, a geographical location, a data type, and/or a group of users, and
      wherein the target aggregate utility function describes a relationship between a performance measure of the first flow aggregate and a service quantity delivered by the network to the first flow aggregate;
   determining an initial member utility function for each member flow in the first flow aggregate, wherein the initial member utility function describes a relationship between a performance measure of the respective member flow and a service quantity delivered by the network to the respective member flow;
   generating, for each member flow, an adjusted member utility function based on the initial member utility function for the respective member flow and the target aggregate utility function; and
   allocating, with network control circuitry, a network resource to each member flow based on the corresponding adjusted member utility function by:
      setting an allocation of the network resource for each member flow in the first flow aggregate to a first amount,
      increasing the allocation to a second amount for each member flow by an increment amount,
      freezing the allocation for one or more member flows in the first flow aggregate responsive to determining that the one or more member flows are each saturated, wherein there is at least one additional non-saturated member flow, in the first flow aggregate, that is not frozen; and
      increasing the allocation to a third amount for each non-frozen member flow in the first flow aggregate.

2. The method of claim 1, wherein the allocated network resources are fairly distributed among each flow aggregate in the plurality of flow aggregates and among a respective plurality of member flows within each respective flow aggregate.

3. The method of claim 1, wherein the generating the adjusted member utility function comprises:
generating a set of initial utility values based on the initial member utility function for the each member flow;
mapping the set of initial utility values to a set of adjusted utility values in the target aggregate utility function; and
generating the adjusted member utility function for the each member flow based on the set of adjusted utility values.

4. The method of claim 3, wherein the mapping comprises:
generating an initial aggregate utility function based on the initial member utility function for the each member flow;
determining, from the initial aggregate utility function, a network resource value corresponding to an initial utility value of the set of initial utility values; and
determining an adjusted utility value of the set of adjusted utility values, wherein the adjusted utility value is associated with the network resource value in the target aggregate utility function.

5. The method of claim 3, wherein the generating the adjusted member utility function for the each member flow comprises:
determining a network resource value associated with an initial utility value of the set of initial utility values; and
shifting the initial utility value to the adjusted utility value for the determined network resource value in the adjusted member utility function for the each member flow.

6. The method of claim 1, wherein the network resource comprises one of a bandwidth, delay, delay jitter, or loss ratio.

7. A system for allocating network resources, the system comprising network control circuitry configured for:
receiving a target aggregate utility function for a first flow aggregate,
wherein the first flow aggregate is one in a plurality of flow aggregates in a network, and aggregates a plurality of member flows associated with at least one of: an application, a geographical location, a data type, and/or a group of users, and
wherein the target aggregate utility function describes a relationship between a performance measure of the first flow aggregate and a service quantity delivered by the network to the first flow aggregate;
determining an initial member utility function for each member flow in the first flow aggregate, wherein the initial member utility function describes a relationship between a performance measure of the respective member flow and a service quantity delivered by the network to the respective member flow;
generating, for each member flow, an adjusted member utility function based on the initial member utility function for the respective member flow and the target aggregate utility function; and
allocating a network resource to the each member flow based on the corresponding adjusted member utility function by:
setting an allocation of the network resource for each member flow in the first flow aggregate to a first amount,
increasing the allocation to a second amount for each member flow by an increment amount,
freezing the allocation for one or more member flows in the first flow aggregate responsive to determining that the one or more member flows are each saturated, wherein there is at least one additional non-saturated member flow, in the first flow aggregate, that is not frozen; and
increasing the allocation to a third amount for each non-frozen member flow in the first flow aggregate.

8. The system of claim 7, wherein the allocated network resources are fairly distributed among each flow aggregate in the plurality of flow aggregates and among a respective plurality of member flows within each respective flow aggregate.

9. The system of claim 7, wherein the network control circuitry is configured for:
generating a set of initial utility values based on the initial member utility function for the each member flow;
mapping the set of initial utility values to a set of adjusted utility values in the target aggregate utility function; and
generating the adjusted member utility function for the each member flow based on the set of adjusted utility values.

10. The system of claim 9, wherein the network control circuitry is configured for:
generating an initial aggregate utility function based on the initial member utility function for the each member flow;
determining, from the initial aggregate utility function, a network resource value corresponding to an initial utility value of the set of initial utility values; and
determining an adjusted utility value of the set of adjusted utility values, wherein the adjusted utility values, wherein the adjusted utility value is associated with the network resource value in the target aggregate utility function.

11. The system of claim 9, wherein the network control circuitry is configured for:
determining a network resource value associated with an initial utility value of the set of initial utility values; and
shifting the initial utility value to the adjusted utility value for the determined network resource value in the adjusted member utility function for the each member flow.

12. The system of claim 7, wherein the network resource comprises one of a bandwidth, delay, delay jitter, or loss ratio.

13. A method for allocating network resources, the method comprising:
generating a set of utility values based on a plurality of member utility functions, each member utility function associated with a flow, wherein each of the plurality of member utility function describes a respective relationship between a performance measure of the respective associated flow and a service quantity delivered by the network to the respective associated flow;
mapping the set of generated utility values to a set of adjusted utility values in a target aggregate utility function, wherein the target aggregate utility function describes a relationship between a performance measure of a first flow aggregate and a service quantity delivered by the network to the first flow aggregate, and wherein the first flow aggregate is one in a plurality of flow aggregates in a network, and aggregates a plurality of member flows associated with at least one of: an application, a geographical location, a data type, and/or a group of users;
generating a plurality of adjusted member utility functions based on the mapping; and
allocating a network resource to each member flow of the first flow aggregate based on the generated adjusted member utility functions by:

setting an allocation of the network resource for each member flow in the first flow aggregate to a first amount, increasing the allocation to a second amount for each member flow by an increment amount, freezing the allocation for one or more member flows in the first flow aggregate responsive to determining that the one or more member flows are each saturated, wherein there is at least one additional non-saturated member flow, in the first flow aggregate, that is not frozen; and increasing the allocation to a third amount for each non-frozen member flow in the first flow aggregate.

14. The method of claim 13, wherein the allocated network resources are fairly distributed among each flow aggregate in the plurality of flow aggregates and among a respective plurality of member flows within each respective flow aggregate.

15. The method of claim 13, wherein the network resource comprises one of a bandwidth, delay, delay jitter, or loss ratio.

* * * * *